3,131,190
9-AMINOALKYL AND 9-AMINOALKYLIDENE
DERIVATIVES OF ACRIDAN
Charles L. Zirkle, Berwyn, Pa., assignor to Smith Kline &
French Laboratories, Philadelphia, Pa., a corporation
of Pennsylvania
No Drawing. Filed Mar. 22, 1963, Ser. No. 267,339
17 Claims. (Cl. 260—279)

This invention relates to novel 9-aminoalkylacridans having pharmacodynamic activity and to novel 9-aminoalkylideneacridans having utility as intermediates for 9-aminoalkylacridans of this invention and also having pharmacodynamic activity. In addition this invention relates to new 9-aminoalkyl-9-hydroxyacridans which are intermediates for the preparation of therapeutic compounds of this invention.

More specifically, the pharmacodynamically active compounds of this invention have central nervous system activity and are useful as tranquilizers, ataractics, antidepressants, antiemetics, antihistaminics, antispasmodics and anti-inflammatory agents.

Novel compounds of this invention are represented by the following formulas:

Formula I

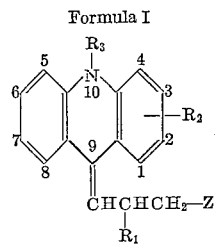

Formula II

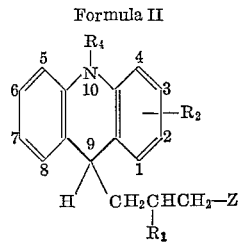

when:
$R_1$ represents hydrogen or methyl;
$R_2$ represents hydrogen, halogen having an atomic weight of less than 80, lower alkyl, lower alkoxy, trifluoromethyl, trifluoromethylsulfonyl, dimethylsulfamoyl or lower alkylthio;
$R_3$ represents lower alkyl, lower alkenyl such as allyl, lower alkynyl such as propargyl, cycloalkyl-lower alkylene such as cycloalkylmethyl or -ethyl, phenyl or phenyl-lower alkylene such as benzyl or phenethyl;
$R_4$ represents hydrogen, lower alkyl, lower alkenyl such as allyl, lower alkynyl such as propargyl, cycloalkyl-lower alkylene such as cycloalkylmethyl or -ethyl, phenyl, phenyl-lower alkylene such as benzyl or phenethyl, lower alkanoyl, benzoyl, carbamoyl or carbalkoxy such as carbethoxy; and
Z represents di-lower alkylamino, mono-lower alkylamino, N-pyrrolidinyl, N-piperidyl, N'-lower alkyl-N-piperazinyl, N'-hydroxyalkylene-N-piperazinyl, N'-acetoxyalkylene-N-piperazinyl, N'-carbamoyloxyalkylene-N-piperazinyl, N'-di-lower alkylcarbamoyloxyalkylene-N-piperazinyl, N'-hydroxyalkyleneoxyalkylene-N-piperazinyl or N'-hydroxyalkyleneoxyalkyleneoxyalkylene-N-piperazinyl.

Preferred compounds of this invention are represented by Formulas I and II when $R_1$, $R_2$ and Z are as defined above and
$R_3$ represents lower alkyl and
$R_4$ represents hydrogen, lower alkyl, lower alkanoyl or benzoyl.

Advantageous compounds of this invention are represented by Formulas I and II when:
$R_1$ represents hydrogen;
$R_2$ represents hydrogen, chloro or trifluoromethyl in a position $\beta$ to the hetero ring;
$R_3$ represents methyl or ethyl;
$R_4$ represents hydrogen, methyl or ethyl; and
Z represents dimethylamino, N'-methyl-N-piperazinyl, N'-hydroxyethyl-N-piperazinyl, N'-acetoxyethyl-N-piperazinyl, N'-hydroxyethoxyethyl-N-piperazinyl or N'-hydroxyethoxyethoxyethyl-N-piperazinyl.

Preferred and advantageous compounds of this invention are represented by Formula II when:
$R_1$ represents hydrogen;
$R_2$ represents chloro or trifluoromethyl in a position $\beta$ to the hetero ring;
$R_4$ represents methyl, ethyl or hydrogen; and
Z represents dimethylamino, N'-methyl-N-piperazinyl or N'-hydroxyethyl-N-piperazinyl.

The novel 9-aminoalkyl-9-hydroxyacridan intermediates of this invention have the following formula:

Formula III

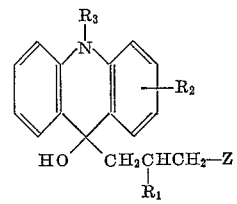

when:
$R_1$ represents hydrogen or methyl;
$R_2$ represents hydrogen, halogen having an atomic weight of less than 80, lower alkyl, lower alkoxy, trifluoromethyl, trifluoromethylsulfonyl, dimethylsulfamoyl or lower alkylthio;
$R_3$ represents lower alkyl, lower alkenyl such as allyl, lower alkynyl such as propargyl, cycloalkyl-lower alkylene such as cycloalkylmethyl or -ethyl, phenyl or phenyl-lower alkylene such as benzyl or phenethyl; and
Z represents di-lower alkylamino, mono-lower alkylamino, N-pyrrolidinyl, N-piperidyl, N'-lower alkyl-N-piperazinyl, N'-hydroxyalkylene-N-piperazinyl and N'-benzyloxyalkylene-N-piperazinyl.

By the terms "lower alkyl," "lower alkoxy" and "lower alkanoyl" where used herein, groups having 1–4 carbon atoms, preferably 1–2, are indicated. The terms "lower alkylene" and "alkylene" where used herein denotes groups having 2–4, preferably 2, carbon atoms. "Cycloalkyl," "lower alkenyl" and "lower alkynyl" where used herein denote groups having 3 to 6 carbon atoms and the term "carbalkoxy" denotes groups having 2 to 5 carbon atoms.

This invention also includes addition salts of the compounds of Formulas I and II hereabove formed with pharmaceutically acceptable acids. Such salts are easily prepared by methods known to the art. The base is reacted with either the calculated amount of organic or inorganic acid in aqueous miscible solvent, such as acetone or ethanol, with isolation of the salt by concentration and cooling or an excess of the acid in aqueous immiscible solvent, such as ethyl ether or chloroform, with the desired salt separating directly. Exemplary of such organic salts are those with maleic, fumaric, benzoic, ascorbic, pamoic, succinic, bismethylenesalicylic, methanesulfonic, ethanedisulfonic, acetic, propionic, tartaric, salicylic, citric, gluconic, lactic, malic, mandelic, cinnamic, citraconic, aspartic, stearic, palmitic, itaconic, glycolic, p-aminobenzoic, glutamic, benzene sulfonic and theophylline acetic acids as well as with the 8-halotheophyllines, for example, 8 - bromotheophylline. Exemplary of such inorganic salts are those with hydrochloric, hydrobromic, sulfuric, sulfamic, phosphoric and nitric acids. Of course, these salts may also be prepared by the classical method of double decomposition of appropriate salts which is well-known to the art.

The addition of acid to alkylideneacridans results in addition of the proton of the acid to the α-carbon of the alkylidene side chain to form an acridinium salt of the acid. This addition occurs when one mole of acid is added to the 9-aminoalkylideneacridans of Formula I. When two or more moles of acid are used, the second mole adds to the amino group of the side chain in the usual manner.

The 9-aminoalkylideneacridans of this invention are prepared as shown in the following synthetic procedure:

PROCEDURE I

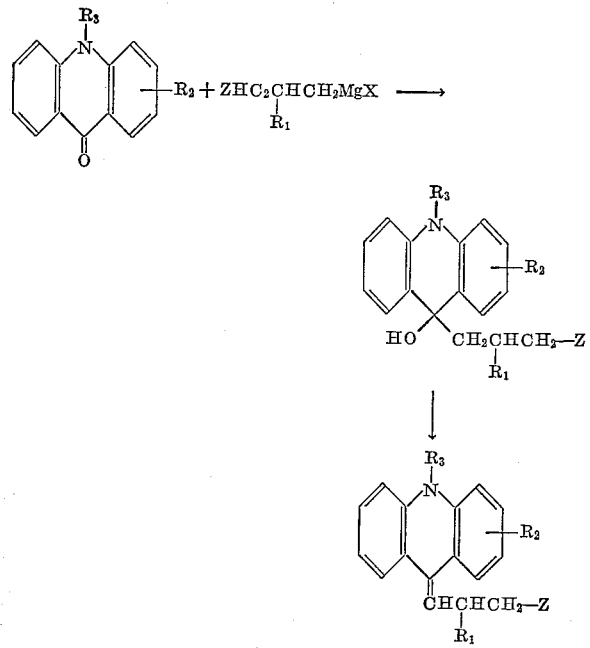

The terms $R_1$, $R_2$ and $R_3$ are as previously defined, X is halogen and Z is di-lower alkylamino, N-pyrrolidinyl, N-piperidyl, N'-lower alkyl-N-piperazinyl or N'-benzyloxyalkylene-N-piperazinyl.

According to the above procedure, the acridone starting material is reacted with an alkylaminopropyl magnesium halide in an inert organic solvent such as an ether for example diethyl ether, dioxane, or preferably, tetrahydrofuran. The reaction is carried out at elevated temperature such as about 35–100° C., conveniently at the reflux temperature of the solvent, for a reaction period of about 30–180 minutes. Removal of the solvent and treatment of the residue with ice cold ammonium chloride solution separates the 9-aminoalkyl-9-hydroxyacridan intermediate which is extracted into an organic solvent such as ether or chloroform. The organic solvent is removed in vacuo and the residue is distilled in vacuo to give the 9-aminoalkylideneacridan of this invention.

Treating the 9-aminoalkyl-9-hydroxyacridan intermediate with acid such as a mineral acid, for example hydrochloric or sulfuric acid, at about 25° to 60° C. for about 10 to 60 minutes results in dehydration and formation of the addition salt as described hereabove.

The aminoalkylidene compounds of Formula I and their addition salts, in addition to having pharmacodynamic activity, in particular where the acridan moiety is substituted by chloro or trifluoromethyl having effects on the central nervous system, are also useful as intermediates in the preparation of the 9-aminoalkylacridans of this invention which have pharmacodynamic activity. The 9-aminoalkylidene compounds are reduced by hydrogenation in the presence of a hydrogenation catalyst, such as platinum oxide or palladium-on-charcoal in a lower alkanol solvent such as ethanol or isopropanol to give the 9-aminoalkylacridans. The addition salts of the 9-aminoalkylideneacridans are reduced by hydrogenation or with bimetallic hydrides such as lithium aluminum hydride in tetrahydrofuran or ether to give the corresponding 9-aminoalkylacridans of Formula II. The 9-aminoalkylacridans in which the 10-substituent is an unsaturated aliphatic group such as lower alkenyl or lower alkynyl are prepared by reduction of the addition salts of the 9-aminoalkylideneacridans with a bimetallic hydride as described above.

The 9-aminoalkyl-9-hydroxyacridans are formed as intermediates in the reaction of the acridone with alkylaminopropyl magnesium halide and are dehydrated by distillation to give the 9-aminoalkylideneacridans. In the above described procedure it is not usually necessary or convenient to isolate the 9-hydroxyacridan in pure form but rather the crude intermediate is distilled to give the 9-aminoalkylideneacridan. In addition, the 9-hydroxy-9-(N'-hydroxyalkylene-N-piperazinyl)alkyl compound is formed as an intermediate in the debenzylation of the N'-benzyloxyalkylene-N-piperazinylalkylidene compounds as described herebelow.

The 9-aminoalkyl-10-unsubstituted acridans of this invention are prepared as follows:

PROCEDURE II

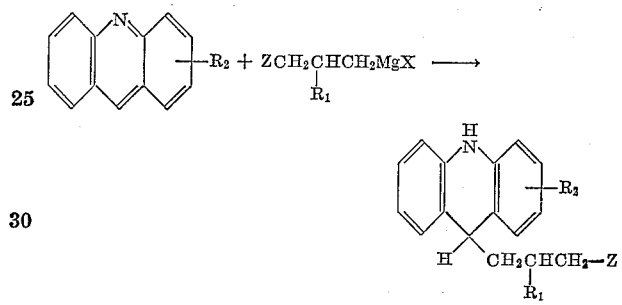

The terms $R_1$ and $R_2$ are as previously defined, X is halogen and Z is di-lower alkylamino, N-pyrrolidinyl, N-piperidyl, N'-lower alkyl-N-piperazinyl or N'-benzyloxyalkylene-N-piperazinyl.

According to the above procedure, the acridine is reacted with an alkylaminopropyl magnesium halide in an inert organic solvent such as an ether for example diethylether, dioxane or, preferably, tetrahydrofuran at about 35–100° C. conveniently at the reflux temperature of the solvent, for about 30–180 minutes. Removing the solvent, treating the residue with ice cold ammonium chloride solution, extracting with an organic solvent such as ether or chloroform and removing the solvent from the extracts gives the 9-aminoalkyl-10-unsubstituted acridans of this invention.

The 9-aminoalkyl-10-lower alkanoylacridans of this invention are prepared by reacting the corresponding 10-unsubstituted acridan with a lower alkanoyl halide such as a chloride or bromide. Similarly the 10-benzoyl, 10-carbamoyl and 10-carbalkoxyacridans are prepared using the appropriate halide.

To prepare the N'-hydroxyalkylene-N-piperazinylalkylidene compounds of this invention the N'-benzyloxyalkylene analog is heated with a mineral acid and the resulting acridinium salt is treated with an alkali metal hydroxide such as sodium hydroxide to give the 9-hydroxy-9 - (N'-hydroxyalkylene-N-piperazinyl)alkyl intermediate which on distillation gives the 9-(N'-hydroxyalkylene-N-piperazinyl)alkylidene compound. Catalytic hydrogenation of the 9-(N'-benzyloxyalkylene-N-piperazinyl)alkylideneacridans gives the corresponding 9-(N'-hydroxyalkylene-N-piperazinyl)alkylacridans of this invention.

Reacting the hydroxyalkylenepiperazinyl compound with acetyl chloride or di-lower alkylcarbamoyl halide in basic solution gives the acetoxyalkylene and di-lower alkylcarbamoyloxyalkylene compounds of this invention respectively. Treating the phenyl carbonate ester of the hydroxyalkylenepiperazinyl compound with liquid ammonia in ether gives the carbamoyloxyalkylene compound. Converting the hydroxyalkylene compound to its p-tosylate ester and reacting with the sodium derivatives of alkylene glycol or dihydroxyalkyl ether gives the hydroxyalkyleneoxyalkylene- and hydroxyalkyleneoxyalkyleneoxyalkylene-piperazinyl compounds.

The compounds of Formula I in which Z is mono-lower alkylamino are prepared by reacting the acridone starting materials with a methoxypropyl magnesium halide under the conditions as described above for the reaction of the acridone with an alkylaminopropyl magnesium halide (Procedure I) to give the intermediate 9-hydroxy-9-methoxypropylacridan. Treating this intermediate with an excess of concentrated (48%) hydrobromic acid results in the replacement of the methoxy group with bromo, the dehydration of the 9-hydroxy group and the formation of a salt with hydrobromic acid. This intermediate is treated with a mono-lower alkylamine to give the salt of 9-mono-lower alkylaminopropylideneacridan formed with one mole of hydrobromic acid.

Treating this salt with base such as sodium or potassium hydroxide in an aqueous alcohol such as ethanol gives the 9-mono-lower alkylaminopropyl-9-hydroxyacridan intermediate of Formula III which as described above gives, on distillation in vacuo, the 9-mono-lower alkylaminopropylideneacridan. Hydrogenation of the propylidene compound gives the corresponding 9-mono-lower alkylaminopropylacridan. Also the salt of the 9-mono-lower alkylaminopropylideneacridan may be reduced with lithium aluminum hydride as described above to give the 9-mono-lower alkylaminopropylacridan directly.

The compounds of Formula II in which $R_4$ is hydrogen and Z is mono-lower alkylamino are prepared by reacting an acridine with an N-lower alkyl-N-benzylaminopropyl magnesium halide under the conditions of Procedure II and removing the N-benzyl substituent from the resulting 9-(N-lower alkyl-N-benzylaminopropyl)-10-unsubstituted acridan by catalytic hydrogenation using a platinum oxide or palladium catalyst in an alcohol solvent such as ethanol or isopropanol.

The acridone starting materials are prepared by cyclizing the appropriately substituted diphenylamine-2-carboxylic acid by the use of a cyclization reagent such as polyphosphoric acid ester or sulfuric acid. Cyclization with phosphorus oxychloride gives the 9-chloroacridine which after converting to the 9-[N-(p-toluenesulfonyl)hydrazino] derivative and treating with an alkali metal hydroxide such as sodium hydroxide in aqueous ethylene glycol gives the acridine starting material. The diphenylamine-2-carboxylic acids are prepared by the Ullman reaction, that is by the interaction of a halogen substituted benzoic acid with an aniline or of an aminobenzoic acid with a halobenzene.

Certain of the compounds of Formulas I and II may be present as isomers: the aminolkylidene compounds may be present as cis or trans isomers and the aminoalkyl compounds exhibit optical isomerism. In addition, the compounds of Formulas I and II in which $R_1$ is methyl may be present as enantiomorphic mixtures. The connotation of the general formulas presented herein is to include all of the isomers.

The following examples are not limiting but are illustrative of the compounds of this invention and the procedures for their preparation and will serve to make fully apparent all of the compounds embraced by the general formulas given above.

Example 1

To a mixture of 2.43 g. of magnesium, 7 ml. of dry tetrahydrofuran and 1 ml. of ethyl bromide is added 11.6 g. of 3-dimethylaminopropyl chloride in 50 ml. of tetrahydrofuran. The resulting mixture is refluxed for 90 minutes. Ten grams of 10-methylacridone in tetrahydrofuran is added slowly and the refluxing is continued for 90 minutes. The mixture is concentrated in vacuo and the residue is poured into ice cold aqueous ammonium chloride. The 9 - hydroxy - 9-(3-dimethylaminopropyl)-10-methylacridan is extracted into ether. The ether solution is dried and concentrated; the residue is twice distilled to give 9 - (3-dimethylaminopropylidene)-10-methylacridan, B.P. 174–180° C. (0.012–0.020 mm.).

Example 2

A mixture of 5.0 g. of 9-(3-dimethylaminopropylidene)-10-methylacridan, prepared as in Example 1, 1.7 g. of 10% palladium-on-charcoal and 125 ml. of ethanol is hydrogenated for four hours. Filtration of the catalyst and removal of the solvent in vacuo leaves a green oil which is crude 9-(3-dimethylaminopropyl)-10-methylacridan. Treatment of this base with ethereal hydrogen chloride and recrystallization of the solid material from ethanol-ether gives the hydrochloride salt of 9-(3-dimethylaminopropyl)-10-methylacridan, M.P. 205.5–207.5° C.

Example 3

A mixture of 12.0 g. of 10-methylacridone and 3-dimethylamino-2-methylpropyl magnesium chloride, prepared as in Example 1 from 2.3 g. of magnesium and 11.6 g. of 3-dimethylamino-2-methylpropyl chloride in tetrahydrofuran, is refluxed in 200 ml. of tetrahydrofuran for two hours. Working up as in Example 1 gives 9-hydroxy-9 - (3-dimethylamino-2-methylpropyl)-10-methylacridan which on distilling, chromatographing with ether on alumina and redistilling gives 9-(3-dimethylamino-2-methylpropylidene)-10-methylacridan, B.P. 171–3° C. (0.15 mm.).

Example 4

A mixture of 5.0 g. of 9-(3-dimethylamino-2-methylpropylidene)-10-methylacridan, 1.5 g. of 10% palladium-on-charcoal and 150 ml. of methanol is hydrogenated for 30 minutes. The mixture is filtered, concentrated and distilled to give 9-(3-dimethylamino-2-methylpropyl)-10-methylacridan.

Treating a solution of the free base in ethyl acetate with an equimolar amount of maleic acid, cooling and concentrating gives the maleate salt.

Example 5

A mixture of 15.0 g. of 10-methylacridone, 21.6 g. of 4-methylpiperazinylpropyl magnesium chloride [prepared by refluxing 1-(3-chloropropyl)-4-methylpiperazine with magnesium in tetrahydrofuran solution] and 200 ml. of tetrahydrofuran is heated at reflux for 90 minutes. The solvent is removed in vacuo and the residue is poured into cold ammonium chloride solution. The organic layer which contains the 9-hydroxy-9-[3-(4-methyl - 1 - piperazinyl)propyl]-10-methylacridan intermediate, is extracted with chloroform. Extracting into hydrochloric acid, basifying the acidic solution and separating and distilling the organic layer gives 9-[3-(4-methyl-1-piperazinyl)propylidene]-10-methylacridan, B.P. 205–215° C. (0.05 mm.).

Example 6

Five grams of 9-[3-(4-methyl-1-piperazinyl)propylidene]-10-methylacridan and 1.75 g. of 10% palladium-on-charcoal in 125 ml. of ethanol is hydrogenated for one hour. The mixture is filtered and treated with excess hydrochloric acid. Filtering and recrystallizing the solid product from methanol gives 9-[3-(4-methyl-1-piperazinyl)propyl]-10-methylacridan dihydrochloride, M.P. 252° C.

Example 7

A mixture of 11.1 g. of 10-ethylacridone, 18.5 g. of 3-dimethylaminopropyl magnesium chloride (prepared as in Example 1) and 150 ml. of dioxane is heated at reflux for 45 minutes. Working up as in Example 1 gives 9-(3-dimethylaminopropylidene)-10-ethylacridan.

Hydrogenation of the above prepared propylidene in ethanol with 2.0 g. of 10% palladium-on-charcoal for two hours gives 9-(3-dimethylaminopropyl)-10-ethylacridan. Treating this free base with an equivalent amount of citric acid in ethyl acetate solution gives, upon concentration and cooling, the citrate salt.

Similarly using 11.8 g. of 10-propylacridone or 12.5 g. of 10-butylacridone in the above procedure 9-(3-dimethylaminopropylidene)-10-propylacridan and 9-(3-dimethylaminopropylidene)-10-butylacridone, respectively, are prepared. Hydrogenation of these propylidene compounds gives 9-(3-dimethylaminopropyl)-10-propylacridan and 9-(3-dimethylaminopropyl)-10-butylacridan respectively.

*Example 8*

A mixture of 12.2 g. of 2-chloro-10-methylacridone, 14.5 g. of dimethylaminopropyl magnesium chloride (prepared as in Example 1) and 175 ml. of tetrahydrofuran is refluxed for two hours. Working up as in Example 1 gives 2-chloro-9-hydroxy-9-(3-dimethylaminopropyl)-10-methylacridan which on distillation gives 2-chloro-9-(3-dimethylaminopropylidene)-10-methylacridan. Treating a sample of this propylidene base in ethanol with an excess of ethereal hydrogen chloride, filtering off the precipitate and recrystallizing from isopropanol gives the salt formed with two moles of hydrochloric acid.

2.4 grams of the above prepared salt of 2-chloro-9-(3-dimethylaminopropylidene)-10-methylacridan is added to a suspension of 1.2 g. of lithium aluminum hydride in 100 ml. of tetrahydrofuran. The mixture is heated at 33–40° C. for 4–5 hours, then is treated with 10% sodium hydroxide solution. The organic layer is separated, the aqueous layer is extracted with ether and the extracts are added to the organic layer which is then dried and distilled to give 2-chloro-9-(3-dimethylaminopropyl)-10-methylacridan. The free base is converted to the hydrochloride salt by treating an alcoholic solution of the base with ethereal hydrogen chloride to separate the salt which is recrystallized from ethanol-ether.

Similarly using 12.2 g. of 3-chloro-10-methylacridone in the above procedure 3-chloro-9-(3-dimethylaminopropylidene)-10-methylacridan is prepared. Hydrogenation of this propylidene yields 3-chloro-9-(3-dimethylaminopropyl)-10-methylacridan.

*Example 9*

A mixture of 11.2 g. of 1,10-dimethylacridone, 14.0 g. of dimethylaminopropyl magnesium chloride and 150 ml. of tetrahydrofuran is refluxed for two hours and then worked up as in Example 1 to give 1,10-dimethyl-9-(3-dimethylaminopropylidene)acridan.

Hydrogenation of a 3 g. sample of the above prepared propylidene compound gives 1,10-dimethyl-9-(3-dimethylaminopropyl)acridan.

*Example 10*

A mixture of 12.0 g. of 2-methoxy-10-methylacridone and 14.0 g. of dimethylaminopropyl magnesium chloride in 125 ml. of tetrahydrofuran is refluxed for 90 minutes. Removing the solvent in vacuo and treating the residue with cold ammonium chloride solution gives 2-methoxy-9-hydroxy-9-(3-dimethylaminopropyl)-10-methylacridan which on distillation gives 2-methoxy-9-(3-dimethylaminopropylidene)-10-methylacridan.

*Example 11*

A mixture of 200 g. of 2-benzyloxyethanol in 2 l. of pyridine at −5° C. is treated with 275 g. of p-toluenesulfonyl chloride and the resulting mixture is stirred at 0° C. for two hours. Water is added slowly at 0–5° C. Extracting with chloroform, washing the extract with dilute hydrochloric acid, water and potassium bicarbonate, and evaporating the solvent leaves benzyloxyethyl p-toluenesulfonate.

A mixture of 186 g. of the above prepared p-toluenesulfonate, 106 g. of N-ethoxycarbonylpiperazine, 44 g. of potassium carbonate and 800 ml. of toluene is refluxed for 21 hours, then filtered and extracted with dilute hydrochloric acid. The extract is basified with sodium hydroxide and extracted into chloroform. Evaporation of the chloroform and distillation of the residue in vacuo gives 1-benzyloxyethyl-4-ethoxycarbonylpiperazine, B.P. 153–156 C. (0.15 mm.).

Hydrolysis and decarboxylation of this ester (188 g.) is accomplished by refluxing with 155 g. of potassium hydroxide, 155 ml. of water and 1550 ml. of ethanol for four days. Filtering, concentrating, adding water to the residue, acidifying with hydrochloric acid, heating to 90° C., saturating with potassium carbonate, extracting into chloroform, basified and evaporating and distilling the chloroform gives N-benzyloxyethylpiperazine.

A mixture of 50 g. of the above prepared piperazine, 30.1 g. of sodium carbonate and 200 ml. of benzene is heated to reflux and treated with 39.5 g. of 3-bromopropanol over 1.5 hours. The resulting mixture is refluxed for two hours, then filtered, extracted with dilute hydrochloric acid, basified, extracted with benzene, and the extracts are concentrated and distilled to give 1-benzyloxyethyl-4-(3-hydroxypropyl)-piperazine, B.P. 188–190° C. (0.15 mm.). The free base is converted to the dihydrochloride salt by treatment of an alcoholic solution with ethereal hydrogen chloride to separate the salt.

Thionyl chloride (67 g.) is added over 15 minutes to a mixture of 39.5 g. of the above prepared dihydrochloride salt and 400 ml. of chloroform. Refluxing for four hours, cooling and filtering yields the dihydrochloride salt of 1-benzyloxyethyl-4-(3-chloropropyl)-piperazine, M.P. 201–202° C. The salt in aqueous solution is basified. Extraction with ether and evaporation of the solvent yields the free base.

Magnesium (1.3 g.) in 8 ml. of refluxing tetrahydrofuran is treated with 1 ml. of ethyl bromide. A solution of 22.7 g. of 1-benzyloxyethyl-4-(3-chloropropyl)-piperazine in 50 ml. of tetrahydrofuran is added slowly and the mixture is refluxed for one hour.

A solution of 10.0 g. of 10-methylacridone in tetrahydrofuran is added over ½ hour and the refluxing is continued for two hours. Removing the solvent in vacuo, pouring the residue into a cold aqueous ammonium chloride solution, extracting the 9-hydroxy-9-[3-(4-benzyloxyethyl-1-piperazinyl)propyl]-10-methylacridan intermediate with ether and concentrating and distilling the extract gives 9-[3-(4-benzyloxyethyl-1-piperazinyl)propylidene]-10-methylacridan.

Heating the above prepared compound on a steam bath with concentrated hydrochloric acid in ethanol, concentrating in vacuo and treating the resulting acridinium chloride with aqueous sodium hydroxide gives 9-hydroxy-9-[3-(4-hydroxyethyl-1-piperazinyl)propyl]-10-methylacridan. Distilling this 9-hydroxy compound furnishes 9-[3-(4-hydroxyethyl-1-piperazinyl)propylidene]-10-methylacridan.

Hydrogenating the above prepared propylidene compound using palladium-on-charcoal catalyst in ethanol gives 9-[3-(4-hydroxyethyl-1-piperazinyl)propyl]-10-methylacridan.

*Example 12*

A mixture of 2.5 g. of 9-[3-(4-hydroxyethyl-1-piperazinyl)propylidene]10-methylacridan, prepared as in Example 11, 5 ml. of acetyl chloride and 25 ml. of dry pyridine is allowed to stand at room temperature for 16 hours. The mixture is poured into dilute sodium hydroxide. Extracting with ether, washing the extracts with water and removing the ether in vacuo gives 9-[3-(4-acetoxyethyl-1-piperazinyl)propylidene]-10-methylacridan.

Similarly reacting acetyl chloride in pyridine with 9-[3-(4-hydroxyethyl-1-piperazinyl)propyl]-10-methylacridan gives the corresponding 4-acetoxyethyl compound.

*Example 13*

Phenyl chlorocarbonate (1.9 g.) is added to a solution of 3.0 g. of 9-[3-(4-hydroxyethyl-1-piperazinyl)propylidene]-10-methylacridan, prepared as in Example 11, in 25 ml. of anhydrous pyridine with stirring. After 15 hours at 25–30° C., water is added and the mixture is extracted with chloroform to give, after concentration of the extracts, the phenylcarbonate of 9-[3-(4-hydroxyethyl-1-piperazinyl)propylidene]-10-methylacridan.

A solution of this phenylcarbonate in 50 ml. on anhydrous ether is added dropwise to 100 ml. of liquid ammonia with stirring. After 10 hours the reaction mixture is treated with water and extracted with ether. The ether extracts are washed with dilute sodium carbonate solution, dried and concentrated in vacuo to give 9-[3-(4-carbamoyloxyethyl-1-piperazinyl)propylidene] - 10-methylacridan. Hydrogenation in ethanol solution using a palladium-charcoal catalyst gives 9-[3-(4-carbamoyloxylethyl-1-piperazinyl)propyl]-10-methylacridan.

The free base is converted to the dihydrochloride salt by treatment with ethanolic hydrogen chloride.

*Example 14*

Treatment of 9-[3-(4-hydroxyethyl-1-piperazinyl)propylidene]-10-methylacridan, prepared as in Example 11, with powdered sodium in toluene and dimethylcarbamoyl chloride gives, after refluxing for three hours, treating with water, and concentrating the organic layer, 9-[3-(4-dimethylcarbamoyloxyethyl-1 - piperazinyl)propylidene]-10-methylacridan.

Similarly by employing diethylcarbamoyl chloride in the above procedure, 9-[3-(4-diethylcarbamoyloxyethyl-1-piperazinyl)propylidene]-10-methylacridan is obtained.

A mixture of 2.0 g. of 9-[3-(4-dimethylcarbamoyloxyethyl-1-piperazinyl)propylidene]-10-methylacridan, 0.4 g. of palladium-on-charcoal and 50 ml. of ethanol is hydrogenated at atmospheric pressure for two hours. Filtration and removal of the solvent in vacuo gives 9-[3-(4-dimethylcarbamoyloxyethyl-1-piperazinyl)propyl]-10-methylacridan.

*Example 15*

A mixture of 20.0 g. of 9-[3-(4-hydroxyethyl-1-piperazinyl)propylidene]-10-methylacridan, made as in Example 11, and 18 g. of p-toluenesulfonyl chloride in 100 ml. of pyridine is allowed to stand at room temperature for 24 hours. The mixture is poured into water and extracted with benzene. The benzene extracts are washed with water, dried and the solvent removed in vacuo to give the p-tosylate ester of 9-[3-(4-hydroxyethyl-1-piperazinyl)propylidene]10-methylacridan. Treating this p-tosylate ester with 6.0 g. of the sodium derivative of ethylene glycol in benzene, adding water, extracting with benzene and evaporating the benzene extracts leaves 9-[3-(4-hydroxyethoxyethyl-1-piperazinyl)propylidene] - 10 - methylacridan.

Similarly reacting the p-tosylate ester of 9-[3-(4-hydroxyethyl - 1 - piperazinyl)propylidene] - 10 - methylacridan with the sodium derivative of β-hydroxyethyl ether in benzene gives 9-[3-(4-hydroxyethoxyethoxyethyl-1-piperazinyl)propylidene]-10-methylacridan.

Hydrogenating the above prepared propylidenes gives 9 - [3 - (4 - hydroxyethoxyethyl - 1 - piperazinyl)propyl]-10-methylacridan and 9-[3-(4-hydroxyethoxyethoxyethyl-1-piperazinyl)propyl]-10-methylacridan, respectively.

*Example 16*

Twenty grams of 3-trifluoromethylacridone is refluxed with methyl iodide in acetone containing potassium carbonate for four hours. The mixture is cooled and treated with water. The benzene layer is separated, washed with water, dried, concentrated and distilled to give N-methyl-3-trifluoromethylacridone.

A mixture of 14.0 g. of N-methyl-3-trifluoromethylacridone and 3-dimethylaminopropyl magnesium chloride (prepared from 11.6 g. of 3-dimethylaminopropyl chloride and 2.4 g. of magnesium) in 75 ml. of tetrahydrofuran is heated at reflux for 1.5 hours. Working up as in Example 1 gives 9-hydroxy-3-trifluoromethyl-9-(3-dimethylaminopropyl)-10-methylacridan which on distillation gives 3-trifluoromethyl-9-(3-dimethylaminopropylidene)-10-methylacridan.

Hydrogenating the above prepared propylidene in ethanol using palladium-on-charcoal catalyst gives 3-trifluoromethyl-9-(3-dimethylaminopropyl)-10-methylacridan.

*Example 17*

A mixture of 25.0 g. of p-bromophenyl trifluoromethyl sulfone, 18.0 g. of N-acetylanthranilic acid, 35 g. of potassium carbonate and 2.0 g. of copper powder in dimethylformamide is heated at reflux for about 48 hours. The mixture is filtered, treated with water and the solvent acidified with hydrochloric acid. The precipitate is filtered off to give 2-(4-trifluoromethylsulfonylphenylamino)benzoic acid.

The above prepared benzoic acid derivative is heated with excess polyphosphoric acid ester (prepared by adding ethanol dropwise to phosphorus pentoxide) for 50 minutes at 110–115° C. The mixture is cooled, treated with water and filtered. The solid material is washed with sodium bicarbonate (10% aqueous solution) and recrystallized from aqueous ethanol to give 2-trifluoromethylsulfonylacridone.

A mixture of 16.8 g. of 2-trifluoromethylsulfonylacridone, 30.0 g. of methyl iodide and 15.0 g. of potassium carbonate in acetone is refluxed for 3.5 hours and worked up as in Example 16 to give N-methyl-2-trifluoromethylsulfonylacridone.

Treatment of N-methyl-2-trifluoromethylsulfonylacridone with 3-dimethylaminopropyl magnesium chloride as in Example 1 gives 9-hydroxy-2-trifluoromethylsulfonyl-9-(3-dimethylaminopropyl)-10-methylacridan which on distillation gives 2-trifluoromethylsulfonyl-9-(3-dimethylaminopropylidene)-10-methylacridan. Hydrogenating this propylidene compound in ethanol with palladium-on-charcoal catalyst gives 2-trifluoromethylsulfonyl-9-(3-dimethylaminopropyl)-10-methylacridan.

Similarly using 24.0 g. 4-iodo-trifluoromethylbenzene in place of p-bromophenyl trifluoromethyl sulfone in the above procedure 2-trifluoromethyl-9-(3-dimethylaminopropylidene)-10-methylacridan is prepared. Hydrogenation gives 2-trifluoromethyl-9-(3-dimethylaminopropyl)-10-methylacridan. The base in ethanol is treated with ethereal hydrogen chloride to give, after concentrating and cooling, 2-trifluoromethyl-9-(3-dimethylaminopropyl)-10-methylacridan hydrochloride.

*Example 18*

A mixture of 14.0 g. of p-methylthioaniline, 15.6 g. of o-chlorobenzoic acid, 13.8 g. of potassium carbonate and 0.2 g. of copper powder in 300 ml. of amyl alcohol is heated at reflux for three hours. Working up as in Example 17 gives 2-(4-methylthiophenylamino)benzoic acid which is cyclized by heating for 45 minutes with polyphosphoric acid ester to give 2-methylthioacridone.

The above prepared acridone is methylated by refluxing with excess methyl iodide and potassium carbonate in acetone to give 2-methylthio-10-methylacridone.

A mixture of 12.7 g. of 2-methylthio-10-methylacridone and 16.8 g. of dimethylaminopropyl magnesium chloride in tetrahydrofuran is refluxed for two hours, then worked up as in Example 1 to give 9-hydroxy-2-methylthio-9-(3-dimethylaminopropyl)-10-methylacridan which on distillation, gives 2-methylthio-9-(3-dimethylaminopropylidene)-10-methylacridan.

Hydrogenation of the above prepared propylidene gives 2 - methylthio - 9 - (3 - dimethylaminopropyl) - 10 - methylacridan.

*Example 19*

By the procedure of Example 18, N',N'-dimethylsulfanilamide is reacted with o-chlorobenzoic acid and the resulting 2-[4-(N,N-dimethylsulfamoyl)-phenylamino]benzoic acid is cyclized to give 2-(N,N-dimethylsulfamoyl)-acridone. This acridone is methylated and reacted with dimethylaminopropyl magnesium chloride to give 2-(N,N-dimethylsulfamoyl) - 9 - (3 - dimethylaminopropylidene)-10-methylacridan which is hydrogenated to give the corresponding propyl compound.

Example 20

A mixture of 10.0 g of acridine and 3-dimethylaminopropyl magnesium chloride (prepared from 10.2 g. of 3-dimethylaminopropyl chloride and 2.24 g. of magnesium) in 60 ml. of tetrahydrofuran is refluxed for four hours. The mixture is concentrated in vacuo and the residue is poured into ice cold aqueous ammonium chloride. Extracting with ether, then concentrating and distilling the extract gives 9-(3-dimethylaminopropyl)-acridan.

Example 21

Five grams of 9-(3-dimethylaminopropyl)acridan is refluxed in 50 ml. of acetic anhydride for 3.5 hours. The mixture is concentrated, treated with ether and extracted with dilute hydrochloric acid. The acid extracts are basified, dried, extracted into chloroform and the chloroform extracts are concentrated and distilled to give 10-acetyl-9-(3-dimethylaminopropyl)acridan.

Similarly refluxing 9-(3-dimethylaminopropyl)-acridan with excess benzoyl chloride in pyridine gives 10-benzoyl-9-(3-dimethylaminopropyl)acridan.

By the same procedure using carbamoyl chloride or carbethoxy chloride in place of benzoyl chloride the products are 10-carbamoyl-9-(3-dimethylaminopropyl) acridan and 10-carbethoxy-9-(3-dimethylaminopropyl)-acridan.

Example 22

Forty grams of 2-(4-chlorophenylamino) benzoic acid are heated at reflux with 125 ml. of phosphorus oxychloride for five hours. The excess phosphorus oxychloride is removed and the residue is poured into ice water containing an excess of concentrated ammonium hydroxide. Cold dilute ammonia is added and the mixture is stirred. The solid material is filtered, washed with water and recrystallized from carbon tetrachloride to give 2,9-dichloroacridine.

A warm solution of 14.8 g. of 2,9-dichloroacridine in chloroform is added in portions to 11.2 g. of p-toluenesulfonylhydrazide in 150 ml. of chloroform with mild refluxing. The mixture is allowed to stand at room temperature for 48 hours. Gaseous hydrogen chloride is bubbled through the mixture. The precipitate is 2-chloro-9-[N-(p-toluenesulfonyl)hydrazino]acridine hydrochloride.

To a warm solution of 24.0 g. of sodium hydroxide in 200 ml. of ethylene glycol and 90 ml. of water is added 16.0 g. of 2-chloro-9-[N-(p-toluenesulfonyl)hydrazino]-acridine hydrochloride. The mixture is heated on a steam bath for 2.5 hours, then diluted with water and cooled. The precipitate is collected, stirred with warm 1 N hydrochloric acid and the acid solution is basified with ammonium hydroxide. The product is 2-chloroacridine.

A mixture of 5.5 g. of 2-chloroacridine and 6.2 g. of 3-dimethylaminopropyl magnesium chloride in 50 ml. of tetrahydrofuran is refluxed for four hours. Working up as in Example 20 gives 2-chloro-9-(3-dimethylaminopropyl)acridan.

Example 23

By the procedure of Example 16, 2-bromoacridone is methylated and the resulting N-methyl-2-bromoacridone is refluxed in tetrahydrofuran with 3-dimethylaminopropyl magnesium chloride for two hours to give, after working up as in Example 1, 2-bromo-9-(3-dimethylaminopropylidene)-10-methylacridan. Treating this base with an excess of ethereal hydrogen chloride and reducing the resulting salt with lithium aluminum hydride by the procedure of Example 8 furnishes 2-bromo-9-(3-dimethylaminopropyl)-10-methylacridan.

Example 24

Ten grams of N-phenylacridone is added to the Grignard reagent formed from 6.7 g. of dimethylaminopropyl chloride and 1.6 g. of magnesium in tetrahydrofuran and the resulting mixture is refluxed for four hours. The mixture is concentrated to an oil which is poured into an ammonium chloride-ice water mixture. The 9-hydroxy-9-(3-dimethylaminopropyl)-10-phenylacridan is filtered off and distilled to give 9-(3-dimethylaminopropylidene)-10-phenylacridan, M.P. 118–120° C. The base in ethanol is treated with excess ethereal hydrogen chloride to give the salt formed with two moles of hydrochloride acid which after recrystallizing from ether-ethanol melts at 217° C. (dec.).

The above prepared propylidene base is hydrogenated in 100 ml. of methanol using 1.5 g. of 10% palladium-on-charcoal. The resulting mixture is filtered hot, then cooled and the white crystals which separate are filtered off and recrystallized from aqueous methanol to give 9-dimethylaminopropyl-10-phenylacridan.

Example 25

A mixture of 7.5 g. of N-benzylacridone and the Grignard reagent formed from 4.8 g. of dimethylaminopropyl chloride and 0.97 g. of magnesium in tetrahydrofuran is refluxed for four hours. Working up as in Example 24 gives 10-benzyl-9-(3-dimethylaminopropylidene)-acridan, B.P. 220–5° C. (0.2 mm.) which is chromatographed and distilled to give the pure propylidene compound.

Hydrogenating the propylidene compound in methanol using palladium-on-charcoal catalyst gives 10-benzyl-9-(3-dimethylaminopropyl)acridan.

Example 26

A mixture of 11.3 g. of N-allylacridone (prepared as in Example 16 from acridone and allyl chloride) and the Grignard reagent formed from 8.8 g. of dimethylaminopropyl chloride and 1.8 g. of magnesium is refluxed in tetrahydrofuran for four hours. The mixture is concentrated, poured into an ammonium chloride-ice water mixture and extracted with ether. The ether extract is extracted with dilute hydrochloric acid. The acid extract is basified with sodium hydroxide and extracted with ether. The ether extract is distilled to give 10-allyl-9-(3-dimethylaminopropylidene)acridan, B.P. 185° C. (0.2 mm.).

Forming the salt of 10-allyl-9-(3-dimethylaminopropylidene)acridan with two moles of hydrochloric acid and reducing the salt with lithium aluminum hydride in tetrahydrofuran as described in Example 8 gives 10-allyl-9-(3-dimethylaminopropyl)acridan.

By the above procedure N-propargylacridone (prepared as in Example 16 from acridone and propargyl chloride) is refluxed with dimethylaminopropyl chloride and magnesium to give, after working up as described above, 9-(3-dimethylaminopropylidene)-10-propargylacridan. Converting this base to a salt and reducing with lithium aluminum hydride in tetrahydrofuran gives 9-(3-dimethylaminopropyl)-10-propargylacridan.

Example 27

A mixture of 10.5 g. of N-methylacridone and 13.2 g. of 3-methoxypropyl magnesium chloride in 125 ml. of tetrahydrofuran is refluxed for four hours then worked up as in Example 1 to give 9-hydroxy-9-(3-methoxypropyl)-10-methylacridan.

This hydroxy compound is heated with excess 48% hydrobromic acid to give after removal of the excess acid the salt of 9-(3-bromopropylidene)-10-methylacridan formed with one mole of hydrobromic acid. Treating this bromo compound with excess methylamine in aqueous ethanol gives the salt of 9-(3-methylaminopropylidene)-10-methylacridan formed with one mole of hydrobromic acid.

The salt is treated with an excess of aqueous sodium hydroxide to give 9-hydroxy-9-(3-methylaminopropyl)-10-methylacridan which is distilled to furnish 9-(3-methylaminopropylidene)-10-methylacridan.

Hydrogenation of the propylidene compound by the procedure of Example 2 gives 9-(3-methylaminopropyl)-10-methylacridan.

Example 28

Ten grams of 2-trifluoromethylacridone (prepared by the procedure of Example 17) is refluxed for three hours with an excess of bromomethylcyclopropane in acetone containing potassium carbonate and worked up as in Example 16 to give N-cyclopropylmethyl-2-trifluoromethylacridone. Refluxing this acridone with an excess of 3-dimethylaminopropyl magnesium chloride in tetrahydrofuran and working up as in Example 1 gives 10-cyclopropylmethyl-9-hydroxy - 9 - (3-dimethylaminopropyl)-2-trifluoromethylacridan which is distilled to give 10-cyclopropylmethyl - 9 - (3-dimethylaminopropylidene)-2-trifluoromethylacridan.

Hydrogenating the propylidene in ethanol with a palladium-on-charcoal catalyst gives 10-cyclopropylmethyl-9-(3-dimethylaminopropyl)-2-trifluoromethylacridan.

By the above procedure using 2-bromoethylcyclopentane or 2-bromoethylcyclohexane in place of bromomethylcyclopropane the products are:

10-(2-cyclopentylethyl) - 9 - (3-dimethylaminopropylidene-2-trifluoromethylacridan and the corresponding 9-(3-dimethylaminopropyl) compound and 10-(2-cyclohexylethyl) - 9 - (3-dimethylaminopropylidene)-2-trifluoromethylacridan and the corresponding 9-(3-dimethylaminopropyl) compound, respectively.

This application is a continuation-in-part of Serial No. 202,399, filed June 14, 1962, now abandoned.

What is claimed is:

1. A chemical compound of the class consisting of a free base and addition salts formed with pharmaceutically acceptable acids, said base selected from the group consisting of compounds having the following formulas:

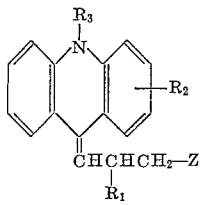 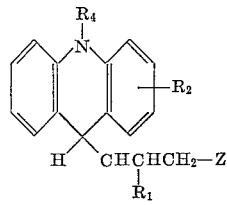

in which:
R₁ is a member selected from the group consisting of hydrogen and methyl;
R₂ is a member selected from the group consisting of hydrogen, halogen having an atomic weight of less than 80, lower alkyl, lower alkoxy, trifluoromethyl, trifluoromethylsulfonyl, dimethylsulfamoyl and lower alkylthio;
R₃ is a member selected from the group consisting of lower alkyl, lower alkenyl, lower alkynyl, cycloalkyl-lower alkylene, phenyl and phenyl-lower alkylene;
R₄ is a member selected from the group consisting of hydrogen, lower alkyl, lower alkenyl, lower alkynyl, cycloalkyl-lower alkylene, phenyl, phenyl-lower alkylene, lower alkanoyl, benzoyl, carbamoyl and carbalkoxy; and
Z is a member selected from the group consisting of di-lower alkylamino, mono-lower alkylamino, N-pyrrolidinyl, N-piperidyl, N'-lower alkyl-N-piperazinyl, N'-hydroxyalkylene-N-piperazinyl, N'-acetoxyalkylene-N-piperazinyl, N'-carbamoyloxyalkylene-N-piperazinyl, N'-di-lower alkylcarbamoyloxyalkylene-N-piperazinyl, N'-hydroxyalkyleneoxyalkylene-N-piperazinyl and N'-hydroxyalkyleneoxyalkleneoxalkylene-N-piperazinyl.

2. A chemical compound of the formula:

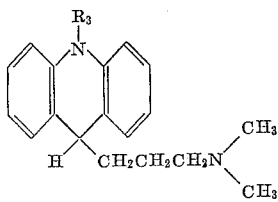

in which R₃ is lower alkyl.

3. The chemical compound of claim 2 in which R₃ is methyl.

4. A chemical compound of the formula:

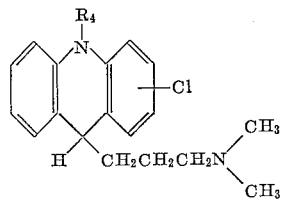

in which R₄ is lower alkyl.

5. A chemical compound of claim 4 in which R₄ is methyl and the chloro moiety is in a position β to the hetero ring.

6. 2-chloro-9-(3-dimethylaminopropyl) - 10 - methylacridan.

7. A chemical compound of the formula:

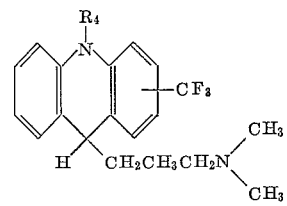

in which R₄ is lower alkyl.

8. A chemical compound of claim 7 in which R₄ is methyl and the trifluoromethyl moiety is in a position β to the hetero ring.

9. 2-trifluoromethyl - 9 - (3-dimethylaminopropyl)-10-methylacridan.

10. A chemical compound of the formula:

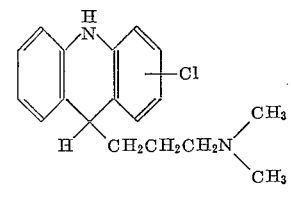

11. 2-chloro-9-(3-dimethylaminopropyl)-acridan.

12. A chemical compound of the formula:

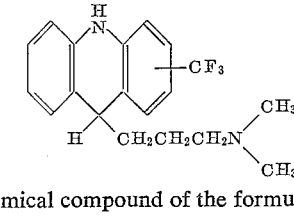

13. A chemical compound of the formula:

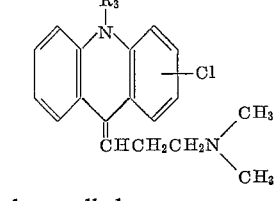

in which R₃ is lower alkyl.

14. A chemical compound of claim 13 in which $R_3$ is methyl and the chloro moiety is in a position $\beta$ to the hetero ring.

15. A chemical compound of the formula:

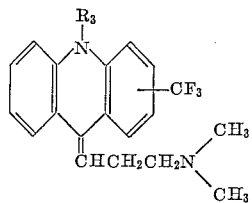

in which $R_3$ is lower alkyl.

16. A chemical compound of claim 15 in which $R_3$ is methyl and the trifluoromethyl moiety is in a position $\beta$ to the hetero ring.

17. A chemical compound of the formula:

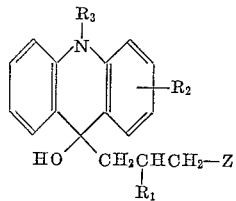

in which:

$R_1$ is a member selected from the group consisting of hydrogen and methyl;

$R_2$ is a member selected from the group consisting of hydrogen, halogen having an atomic weight of less than 80, lower alkyl, lower alkoxy, trifluoromethyl, trifluoromethylsulfonyl, dimethylsulfamoyl and lower alkylthio;

$R_3$ is a member selected from the group consisting of lower alkyl, lower alkenyl, lower alkynyl, cyclo-alkyl-lower alkylene, phenyl and phenyl-lower alkylene; and Z is a member selected from the group consisting of di-lower alkylamino, mono-lower alkylamino, N-pyrrolidinyl, N-piperidyl, N′-lower alkyl-N-piperazinyl, N′-hydroxyalkylene-N-piperazinyl and N′-benzyloxyalkylene-N-piperazinyl.

No references cited.